Jan. 12, 1971   F. JOCHIM ET AL   3,553,833

HEATED GLASS STRUCTURES

Filed Nov. 13, 1967

INVENTORS
FRIEDRICH JOCHIM
DIETER PEETZ
HEINZ KARLA
HERMANN LUERSSEN

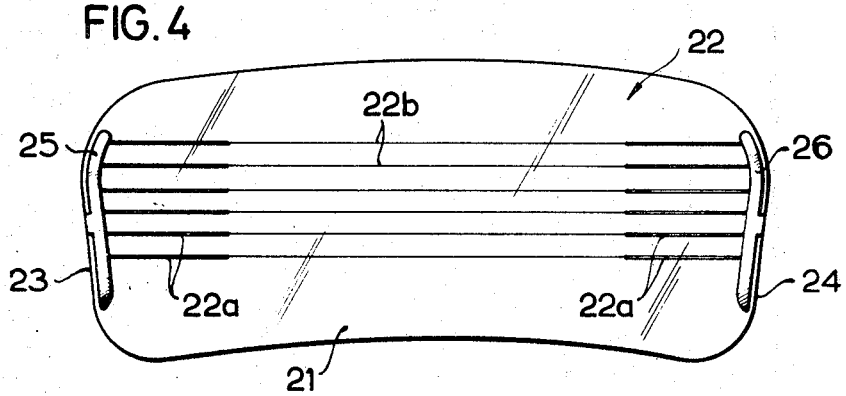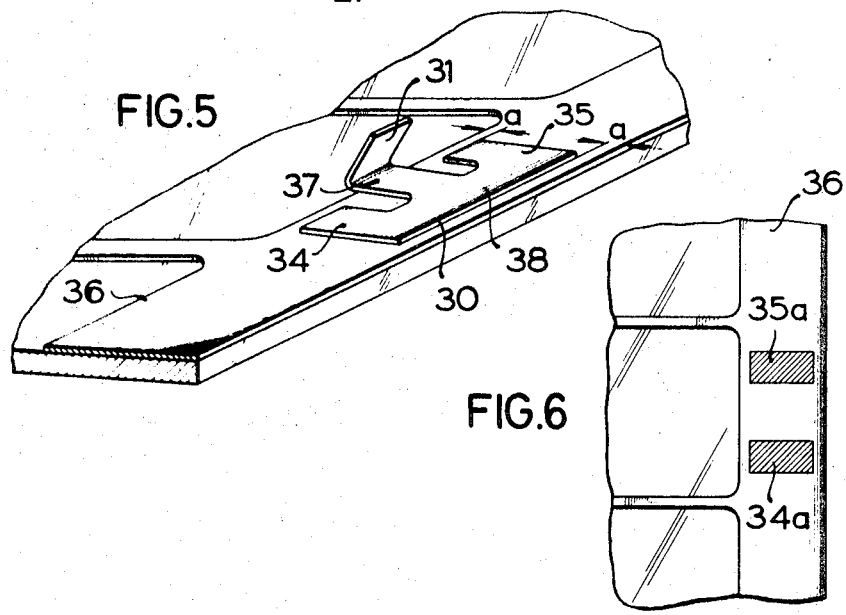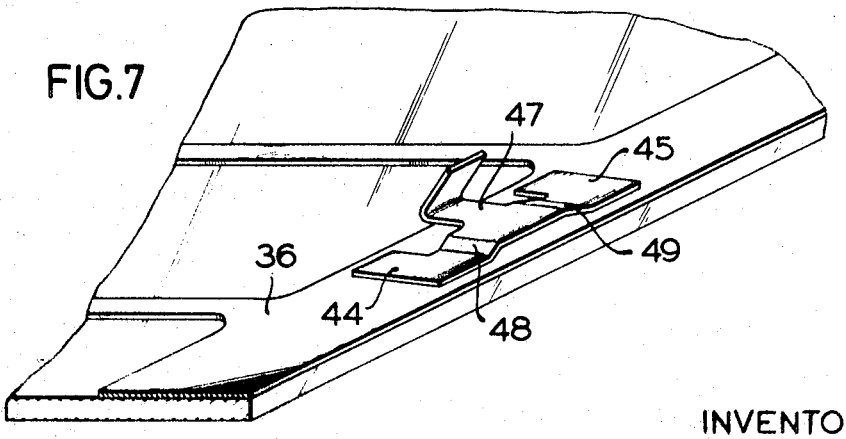

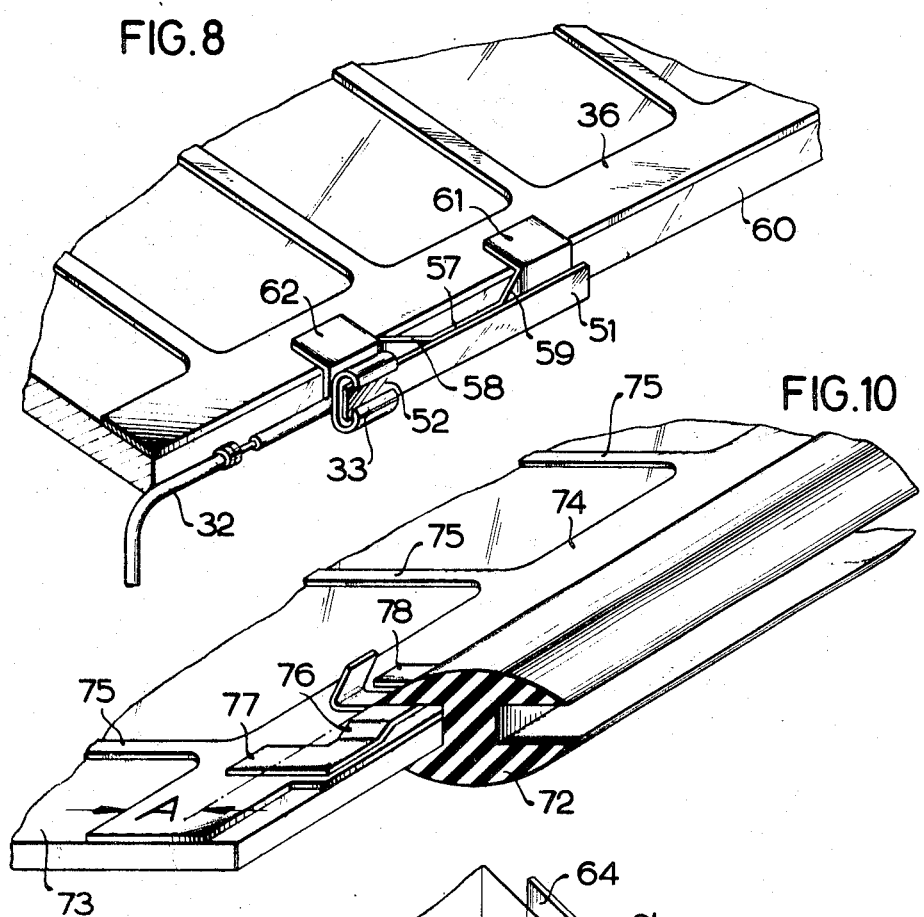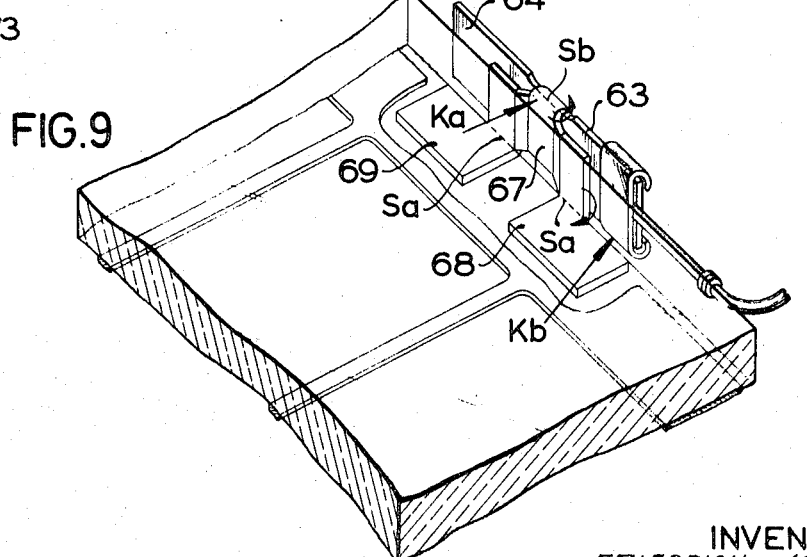

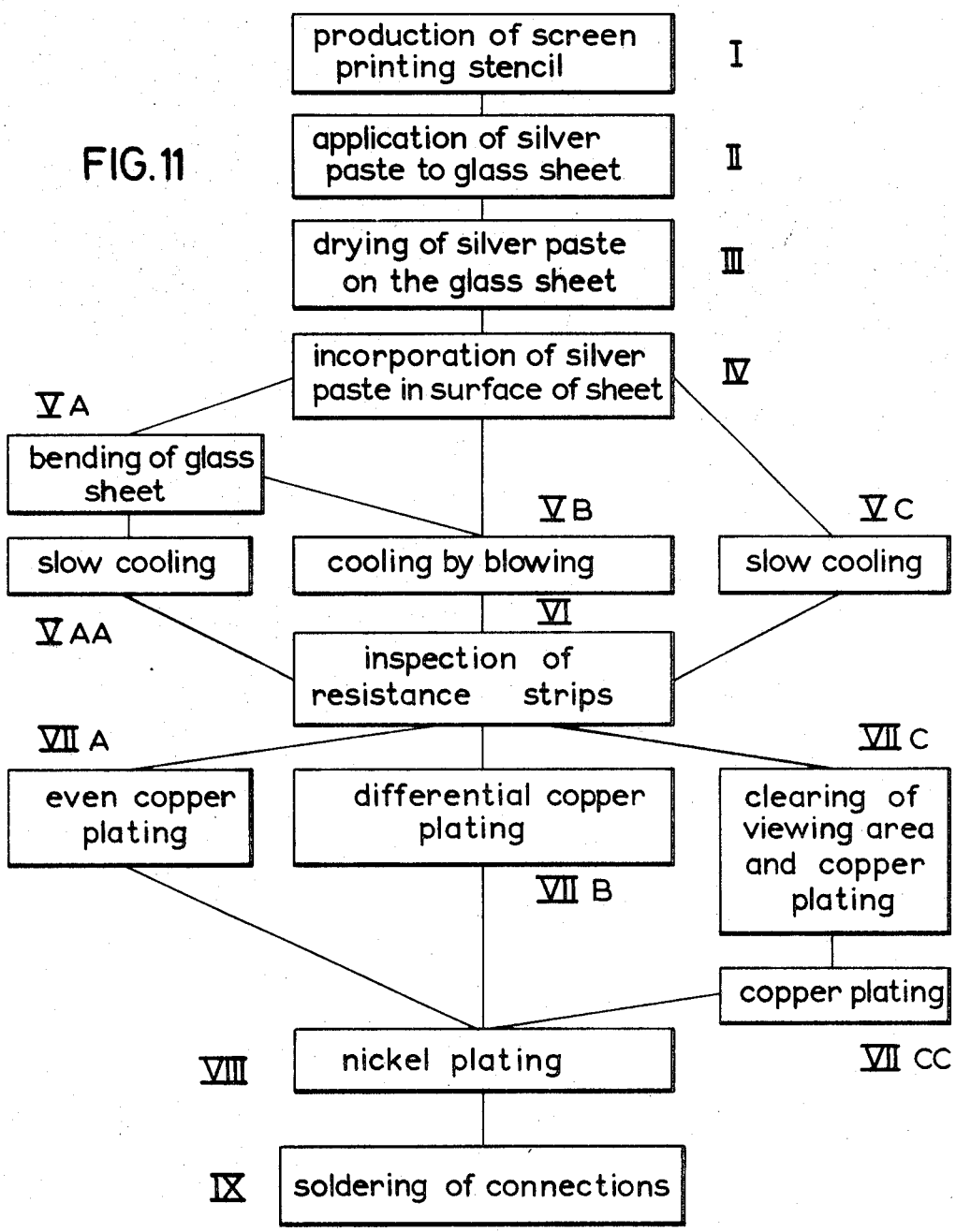

Jan. 12, 1971  F. JOCHIM ET AL  3,553,833

HEATED GLASS STRUCTURES

Filed Nov. 13, 1967  8 Sheets-Sheet 5

INVENTORS
FRIEDRICH JOCHIM
DIETER PEETZ
HEINZ KARLA
HERMANN LUERSSEN

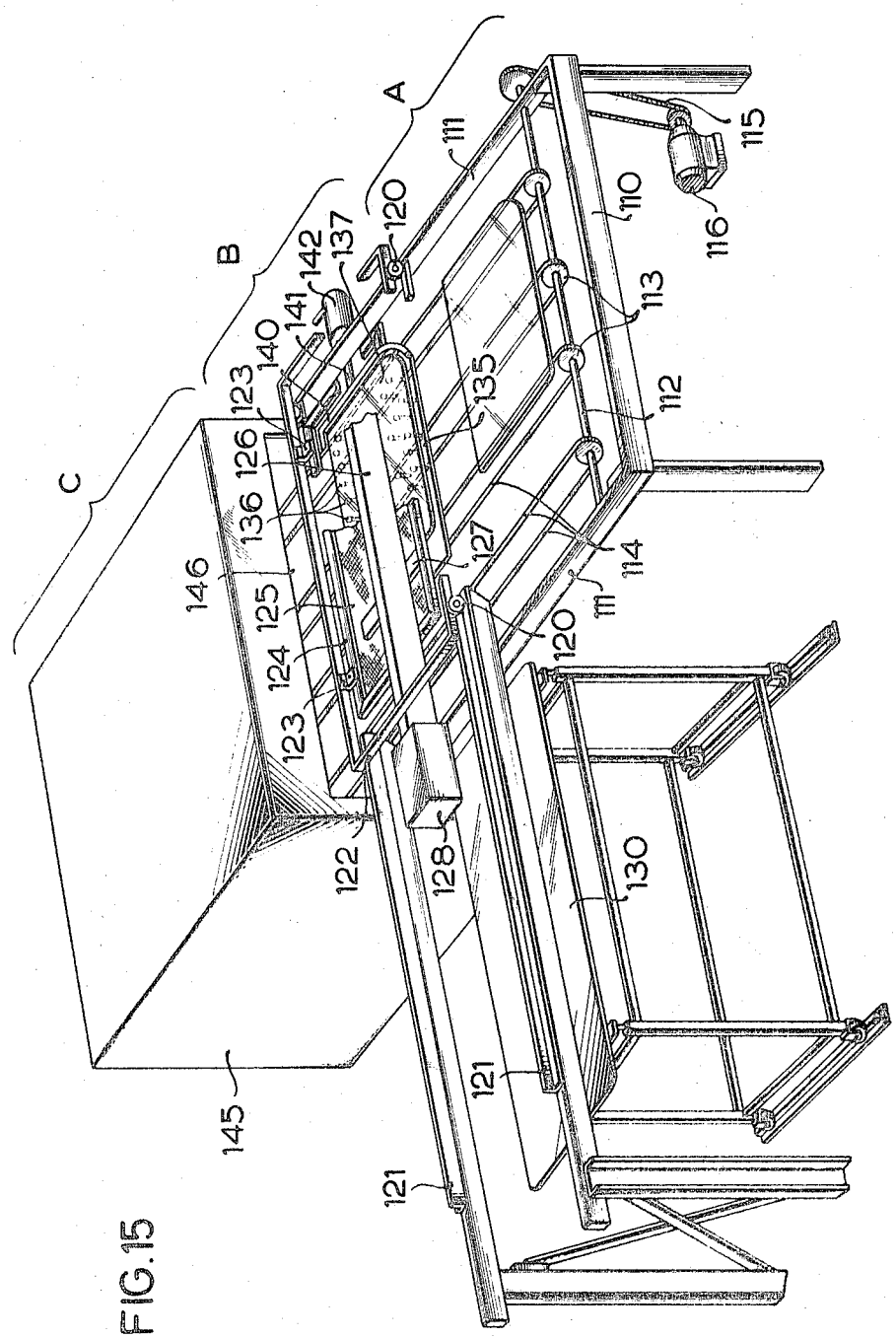

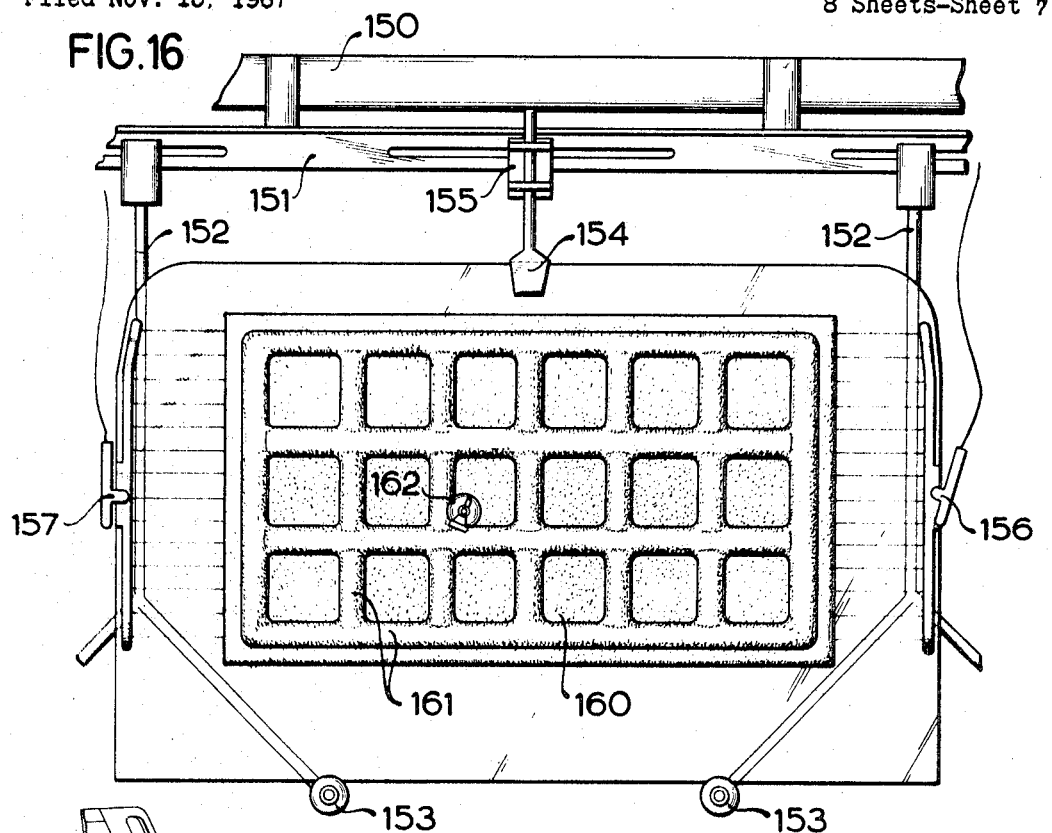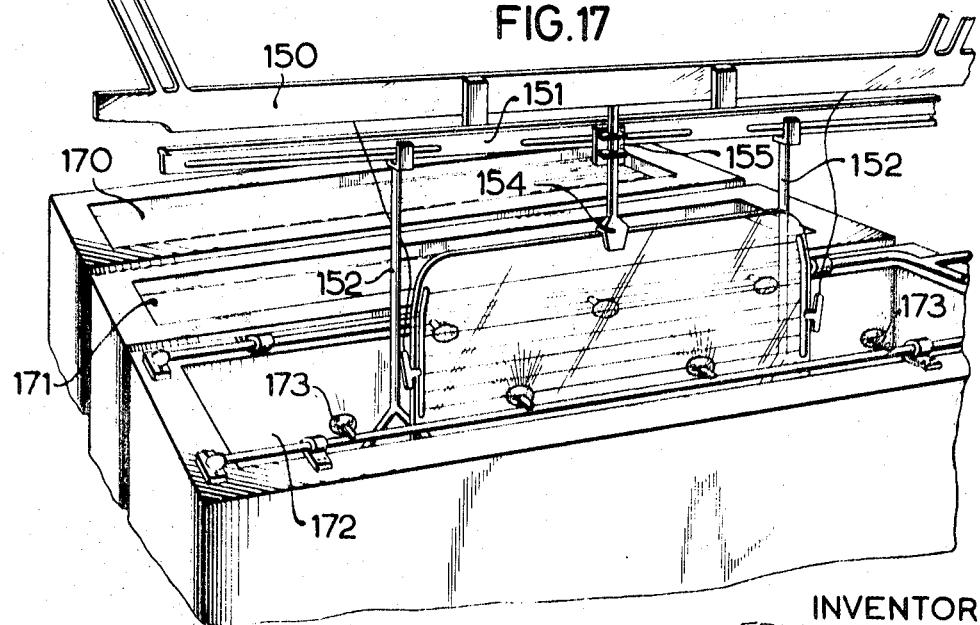

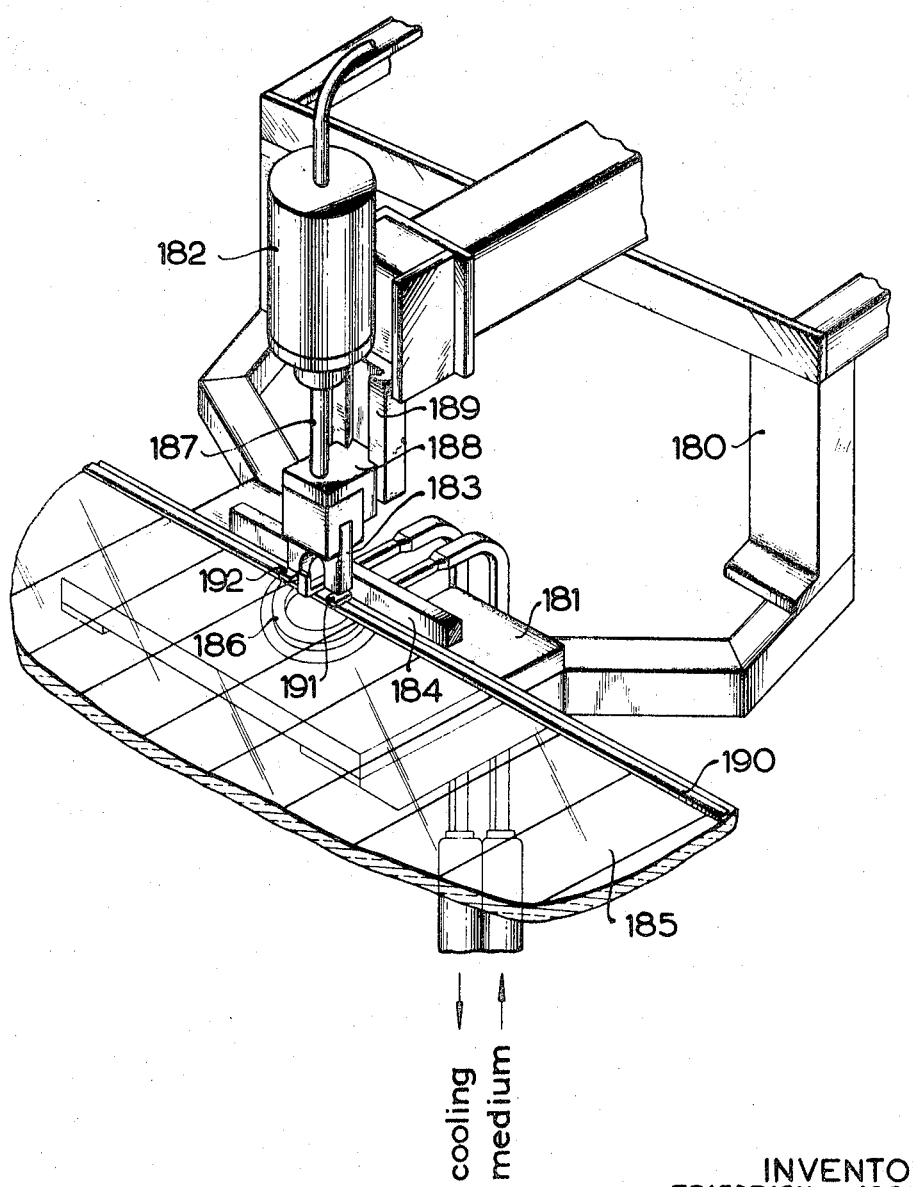

United States Patent Office 3,553,833
Patented Jan. 12, 1971

3,553,833
HEATED GLASS STRUCTURES
Friedrich Jochim, Herzogenrath, Dieter Peetz, Aachen, Heinz, Karla, Herzogenrath, and Hermann Luerssen, Laurensberg, Germany, assignors to Compagnie de Saint-Gobain, Neuilly-sur-Seine, France
Filed Nov. 13, 1967, Ser. No. 682,173
Claims priority, application Germany, Nov. 14, 1966, 1,555,053
Int. Cl. H06b 3/00
U.S. Cl. 29—611                                    17 Claims

ABSTRACT OF THE DISCLOSURE

The specification describes vehicle windows having resistance strips on their faces for heating. The strips are applied by fusing silver particles with the surface, and electroplating the silver with copper and nickel.

---

The present invention relates to sheets of plate glass such as is used for viewing through. Such glass will be spoken of as glass or a glass plate as the sense demands without there being any intention to distinguish between, or exclude any of, the various trade terms in use such as sheet glass, plate glass, floated glass and window glass.

More specifically the present invention relates to electrically heated glass plates.

Electrically heated glass plates are used in road vehicles, ships, railway vehicles and aircraft, such as inspection windows for enclosures containing a high amount of moisture, as shop windows, and as windows for masks such as gas masks and divers helmets, and also in refrigerators, that is to say everywhere where it is important that condensation of water or other vapor to form droplets or ice is to be prevented so that visibility through the glass is not impaired.

Hitherto two basic types of heated glass are in use, that is to say on the one hand glass plates with a transparent electrical resistance layer applied over an extensive area, see for example the U.S. patent specification 2,944,926, and on the other hand sandwich-type constructions with two outer glass layers connected by a plastic intermediate layer in which electrical resistance wires are embedded, see for example the U.S. patent specifications 2,470,509 and 2,507,036.

Both of these two basic types of prior art constructions have, however, not been used on a large scale. Glass with resistance layers has a reduced transparency which renders it unsuitable for certain applications such as road vehicles in which a certain minimum transparency is necessary with the result that the conducting layers made for instance of tin oxide or pure metal must not exceed a certain thickness in order to provide for sufficient transparency. The pure metals used can include nickel, gold, copper and so on. However when the requirement as regards transparency is complied with, it is usually found that the electrical resistance of the layer is so great that the layer cannot be heated by the low voltages, between 6 and 24 volts, of vehicle power supplied to a sufficient degree.

Moreover the application of resistance layers by prior are methods meets with considerable difficulties if sufficient evenness and homogeneity are to be produced. The smallest difference in thickness are, however, readily detected when the glass is looked through or light is reflected from it and also have the disadvantage of leading to unevenness in the removal of condensation or ice layer.

Electrically heated sandwich type glass constructions in which electrical resistance wires are arranged in the intermediate plastic layer are comparatively expensive since they comprise two sheets and a plastic intermediate layer and a manufacture from these components requires technically involved process. Moreover, the evaporation of a condensation layer occurs some time after the switching-on of the heating current and the heat is not developed on the glass surface where it is required, but between the two glass sheets. There is also the disadvantage that such sandwich-type constructions are comparatively easy to break because the two glass sheets used are thin and not prestressed. Also temperature gradients resulting from the heating effect may lead to changes in refractive index of the layer which affect its optical properties. Moreover, the amount of heating current that can be applied to such glass constructions is limited by the use of a plastic intermediate layer.

One object of the present invention is to provide an electrically heated glass plate which is cheap to produce and is therefore suitable for large-scale application in vehicle construction such as rear windows or side windows.

A further object of the invention is to provide an electrically heated glass plate which is heated on that surface which is generally subject to condensation.

A further object of the invention is to provide an electrically heated glass plate with, on at least one of its surfaces, heating resistances which are firmly connected with the glass surface, are sufficiently resistant to scratching and are not attacked by conventional cleaning materials.

A further object of the invention is to provide an electrically heated glass plate which can be operated by low voltages, such as those used in vehicles.

Yet another object to the invention is to provide electrically heated glass plates which are very resistant to bending and impacts.

A further object of the invention is to provide a heated glass plate which is substantially as transparent as normal glass and does not produce troublesome optical distortions.

A further object of the invention is to provide an electrically heated glass plate which, if required, is not heated over its whole surface evenly but is heated over one or more limited areas with a relatively great heating effect.

Yet a further object to the invention is to provide a heated glass plate whose electrical heating resistances have the same resistance for the whole of their extent in order to avoid local overheating or local underheating.

A still further object of the invention is to provide an electrically heated glass plate which is provided with an electrical connecting element or terminal which has a high resistance to mechanically applied, and temperature induced stresses.

In accordance with a still further object of the invention an electrically heated glass plate is provided whose heating resistances and their electrical connecting means are not damaged by the glass plate being held in a rubber frame, as is the case in vehicle applications.

Yet another object of the invention is the provision of an electrically heated glass plate whose resistances for heating are not attacked by the atmosphere or atmospheric impurities.

Further objects of the invention include the provision of particularly suitable methods for achieving the above mentioned objects and suitable apparatus for carrying out the method.

In accordance with a preferred form of the invention an electrically heated glass plate has on at least one of its surfaces a number of resistance strips which are spaced with a distance between them of 2 to 10 cm., extend horizontally from one edge of the plate to the opposite edge, are attached to the glass by fusing on the latter, and subsequently are reinforced by the deposition of metal on them, for instance by electroplating, the strips having a breadth of 0.2 to 0.8 mm., and preferably of 0.4 to 0.6 mm. The preferred form of the glass plate in accordance with the invention comprises terminal strip means, which have a breadth of between 0.5 and 2 cm., run along the lateral edges of the plate, merge with the resistance strips, and are provided with metallic terminal elements fixed to them by soldering, and the resistance strips and possibly the terminal strip means having been made by the application of a paste containing metallic silver which is applied by screen printing and then embedded in the glass surface by heating to a high temperature to form a first layer layer 1 to 20µ thick, the first layer being covered by a second layer of copper of 0.2 to 12µ thickness, and a third layer of nickel of 1 to 6µ in thickness. Although the best results have been obtained with copper and nickel other metals can be used providing they have similar properties.

Conveniently, the glass plate is thermally prestressed glass and the silver layer of the resistant strips and the terminal strip means are incorporated in the surface of the glass plate during the heating necessary for prestressing. The edges of the resistant strips, and preferably the edges of the silver layer fused into the glass surface are, in accordance with a particularly advantageous feature of the invention, not straight but have projections spaced by between 0.01 to 0.2 mm. and extending between 0.01 to 0.1 mm.

With this form of the silver strips fused into the glass surface there is a more even deposition of copper during electroplating or other deposition process, over the whole length of the heating conductors. This leads on the one hand to the resistance strips having a more even resistance so that undesirable or dangerous under- and overheating along the strips is avoided while on the other hand the variations among the individual resistances of the heated glass plates is substantially less with this construction of the resistance strips. It has in fact been found on conducting a detailed program of experiments that the variation in the individual electrical resistance by the construction of the silver layer of the resistance strips mentioned is reduced by a factor of 10. While in the case of resistance strips having straight edges the resistance varied after electroplating between 1.25 ohms to 1.70 ohms, that is to say by 0.45 ohm, this being extremely disadvantageous for mass production, this variation could be reduced to 0.03 ohm by the arrangement of small projections 0.06 mm. broad and spaced by 0.11 one after the other along the strip. In this case the smallest resistance found was 1.42 ohms and the largest was 1.45 ohms.

A further improvement regarding the evenness of the application of the copper layer in the electroplating bath is obtained with a glass plate in accordance with the invention by extending the terminal strip means, which are arranged along the plate edges, beyond the most extreme resistance strips. This extension beyond the most extreme resistance strips should be at least 1 cm. and the extended parts of the terminal strip means should be rounded off at their ends.

This unexpectedly advantageous effect is apparently due to the fact that the formation of the electric field in the electroplating bath is influenced favorably. While copper deposition on the most extreme or outside resistance strips is somewhat less without the measure just mentioned than on the remaining resistance strips so that their resistance is reduced to that below the remaining strips, this trouble can be substantially avoided by a slight extension of the terminal strip means.

In order to enable a heated glass plate to meet all the requirements which may arise, the electrical resistance of the resistance strips should, conveniently, be so dimensioned that with the voltage applied the electrical power absorbed amounts to between 2 and 20 watts per square decimeter. A power of 2 watts is found in practice to be the lowest practical limit while acceptable results are found in the case of motor vehicle rear windows with a power of about 2 to about 8 watts per square decimeter.

In many cases it may be desirable or convenient either only to use one part of the resistance strips or to connect different groups of the resistance strips in series or in parallel as may be required. For this purpose the glass plate in accordance with the invention can be so modified that one terminal means is interrupted at a suitable position so that the resulting two groups of resistance strips are connected in series and the two current connecting elements or terminals are to be applied to both parts of the interrupted strip means.

By interrupting the two terminal strip means two or more groups of resistance strips can be arranged for connection, or several separately arranged groups can be provided which can be connected up individually or in common selectively.

In accordance with a further advantageous further development or embodiment of the invention the collecting strip means arranged along the plate edges are so broad and/or extend so far towards the inner part of the glass plate that when the glass plate is placed in its mounting a sufficiently broad strip for conducting current to the resistance strips is not covered by the mounting of the glass plate. It has in this connection been found that, especially in the case of use of heated plates in motor vehicles that if the terminal strips are completely covered by the rubber mounting material certain resistance strips are not sufficiently heated or ceased to be heated at all after a certain period of use has elapsed.

With the mentioned construction of the terminal strips this disadvantage is avoided. The reason for the impairment of the resistance strips appears to reside in that if the resistance strips themselves come into contact with the rubber material of the mounting, the strips are exposed at these positions to both mechanical stresses and chemical attack. The mechanical stresses are caused by friction due to relative movement between the glass plate and the rubber mounting material owing to shaking of the coachwork during operation. Chemical attacks are apparently due to reactions between the components of the rubber mounting and the material of the resistance strips, such chemical attacks being favored by the preferential collection of moisture in or at the mounting.

The part of the terminal strip means not covered by the rubber mounting should preferably be so broad that it is sufficient for supplying current to all the resistance strips connected with the terminal strip means. Care should also be taken to see that the terminal or current connecting element is also soldered to the part of the terminal strip means not covered by the rubber mounting material.

In accordance with a further particularly preferred embodiment of a glass plate in accordance with the invention the resistance strips have a greater deposit of copper outside at least one of the parts of the plate left for viewing so that the resistance strips have a greater heating effect within this viewing part.

Using this feature it is possible to limit the heating power of the plate over a selected viewing area and thus not to exceed a certain value for the amount of electrical power absorbed without it being necessary to have recourse to conventional constructional features, that is to say the feature that the resistance strips are only arranged in the viewing area and are arranged either in a vertical direction from the upper edge of the plate to the bottom one or that the connecting strips are arranged in a visible manner on both sides of the viewing field on the glass plates. Both of these two latter arrangements are esthetically quite unacceptable and also disturb, in a certain manner, viewing through. On the other hand a glass plate in accordance with the above mentioned further feature of the invention remains unchanged in its general appearance and its optical properties. The increased copper deposit needed for increasing the conductivity of the resistance strips at positions outside the field of view is hardly noticed by the eye.

Especially in the case of rear windows for motor road vehicles, which in many models are extremely broad, it is convenient to arrange for only a selected part of the viewing area to be heated in order to reduce current consumption to the amount that is absolutely necessary, or the viewing area can be provided with more electrical heating power.

In certain circumstances it is possible only to electroplate the terminal strip means to a greater thickness than the remaining parts in order to prevent a heating of the strip means. If the strip means are made sufficiently broad this, however, is generally not necessary.

In all prior art heated glass plates the current connecting element or terminal serving to link the heating system to the source of current is extremely vulnerable and can easily give rise to trouble. The present invention therefore also includes a form of current connecting element or terminal specially developed for the new glass plate in accordance with the invention. The terminal is designated to meet the particular acquirements, that is to say high resistance to thermal stresses and to mechanical loads, to a highly satisfactory extent. A heated glass plate which meets these requirements is characterized, in accordance with a further embodiment of the invention, in that metallic flat connecting elements or terminals are soldered or brazed onto the terminal strip means at separate positions, preferably at two opposite ends, and the region between the soldered joints is so shaped and/or so dimensioned that mechanical stresses in this region, which exceed the strength of the soldered joints and/or the strength the glass, are taken up by reformation of the metal of the connecting element in this region.

The current connecting elements or terminals can conveniently be soldered in the region between the two outermost resistance strips to the terminal strip means in order to insure an even current distribution to all the resistance strips.

Such a current connecting element can be improved by the provision between the joints with the terminal strips on the one hand and the connecting tag on the other of an elastic intermediate piece which is so constructed and/or dimensioned that it is deformed by and takes up a load which is excessive and therefore liable to damage the soldered joint or the glass.

Conveniently, also, the part of the connecting element between the points of connection with the terminal strip means can be bent so that it lies at a distance from the terminal strip means.

Heated glass plates provided with current connecting elements of the described type are so robust and resistant that even very large changes in temperature which especially heated glass plates undergo in the winter do not cause any detachment of the current connecting elements or terminals and also mechanical tensile or impact stresses on the elements occurring during transport and fitting of the glass plates do not lead to damage of the glass plate. Owing to the construction of the current connecting elements in accordance with the invention it is found that sudden and violent mechanical stresses are taken up by elastic or plastic deformation of the region between the soldered joints and/or of the region between the terminal tag and soldered joints, and this prevents dangerous stresses, which might lead to breaking away the surface layer of the glass or stripping off of the terminal strip means from acting on the glass plate.

Convenient forms of the terminal or current connecting element and its essential features will be described below in detail.

In accordance with a further feature of the invention there is provided a particularly satisfactory method for the production of heated glass plates. In accordance with principles of this novel method a glass plate is screen-printed with paste containing metallic silver so as to form strips 0.2 to 0.8 mm. broad running in a direction so as to be horizontal when the plate is finally mounted for use, having a spacing of 2 to 10 cm. and, optionally, 0.5 to 2.5 cm. broad strip means running along the side edges of the plate, the printing being on at least one side of the glass plate, the paste is dried and is then heated to a raised temperature, for example 650° C., so that the paste is fused into the glass surface, the total resistance of the fused-on conducting strips is measured, copper is deposited on the strips in accordance with the measured total resistance, for instance by electroplating, until the conductivity of the strips has been increased sufficiently to provide for an electrical power absorption of the glass plate between 2 and 8 watts per square decimeter of heated surface with the voltage available, the copper plated resistance strips are then provided in a second plating stage, for instance by electroplating, with 1 to $6\mu$ thick nickel layer, and finally metallic current connecting elements or terminals are soldered by induction soldering onto the terminal strip means.

This combination of various proces steps is believed to constitute the first method which is suitable for the mass production of electrically heated glass plates which are extremely reliable in use and have consistent resistance values. The particular advantage of the method resides in that the final resistance can be achieved within close tolerances by the use of the reinforcement by plating of the resistance strips to a degree which is dependent upon the resistance of the silver strips fused into the glass plate, such a control being obtained by varying the current density in the electroplating bath and/or the duration of treatment. Such a degree of accuracy cannot be achieved with a single stage method, that is to say by the application and fusing-in of strips of silver paste alone even if all conceivable measures are taken to insure that the application conditions are held constant. In such a single stage method it is not possible to avoid the breadth and thickness of the silver paste strips constantly undergoing changes in accordance with a number of factors such as the viscosity of the silver paste, the ambient temperature, composition of the paste, speed of application, age of the printing screen, the quantity of silver paste on the screen, and the like. These irregularities which would make such a one-stage process unsuitable for the mass production of electrically heated pates with very small variations in resistance, are compensated for by the controlled plating, preferably electroplating. The copper layer itself is then provided with a nickel layer, preferably also applied by electroplating. This nickel layer has the primary purpose of protecting the copper layer from attack by atmospheric components in order to prevent the electrical resistance being changed owing to corrosion of the copper in the course of time, and has the further purpose of increasing resistance to scratch of the strips.

Conveniently, for carrying out the method, after the measurement of the total resistance of the glass plates provided individually with the fused-in silver strips, the plates are divided in groups of approximately the same resistance and, during the following plating, plates with the same initial resistance are treated under the same conditions.

If several glass plates with different initial resistances are to be treated in the same electroplating bath to achieve the same final resistance, one or more of the glass plates can each be connected with a series resistance of a suitable size so as to adjust the current density per unit area of the surface to be electroplated in such a manner that despite the plating time for all the glass plates being the same the same final resistance is achieved.

A further possibility for treating several glass plates with different initial resistance values simultaneously in the same electroplating bath is to compute, for instance by an automatic device, the required plating time from the initial resistance value measured for each plate before plating, and then arranging for the automatic switching-on and switching-off of the current supplied to the individual glass plates in accordance with the values determined.

It naturally follows that in the case of this embodiment of the method of the invention an independent source of current is necessary for each glass plate so that the switching-off of one or more glass plates does not vary the current density for the remaining glass plates. In carrying out this form of the invention the measurement of the initial resistance is preferably carried out directly before the electroplating, that is to say in the loading station for the electroplating bath itself. The resistance value measured is then fed with the target resistance value to an analog digital converter which determines the necessary electroplating time from these values. The converter supplies a corresponding command to a program selecting device which switches on and off by means of a suitable switching circuit the rectifiers connected with the individual glass plates.

A possible source of error which it is important to avoid lies in the making of contact with the plates so that an increased connection resistance appears and the required current density is not achieved in the electroplating bath. This source of error can be countered by measuring the current flowing through each glass plate after making contact and by switching on a constant current device in the circuit of each glass to serve automatically to achieve the required current density during operation. If, for example, a glass plate has an increased contact resistance, the voltage applied to the glass plate is automatically increased by the constant current device sufficiently to achieve the required current density.

A further substantial improvement of the method in accordance with the invention is achieved by making the screen used for the screen printing such that the resistance strips and the threads of the screen make an angle between 14 and 76°. Such a measure achieves three substantial advantages; on the one hand step-shaped parts of the edges of the resistance strips with steps extending over excessively great distances are avoided which appear with small angles of intersection between the resistance strips and the fabric threads and are disadvantageous for the visual impression made by the resistance strips; on the other hand a dangerous degree of narrowing of the resistance strips is avoided which occurs with very small angles within the section between the resistance strips and the fabric threads and leads to dangerous overheating of the resistance strips; and thirdly the intentional production of a large angle of intersection insures that the edges of the resistance strips are formed by a series of small regularly spaced projections. These small projections are extremely important for the following reinforcement of the strips. Since the deposit of metal in the plating bath, for instance electroplating bath preferentially starts at the corners and projections, as is generally known, so that it is generally difficult with all electroplating processes to achieve layers of even thickness, by the intentional use of this effect using an arrangement of a large number of projections at regular distances an extremely even initiation of the deposit of copper along the whole length of the resistance strips is achieved. The screen printing method is especially suitable for achieving the production of these projections in the required manner if the described angle between the resistance strips and the fabric threads is observed.

Since a printing screen is generally constructed so that the resistance strips run approximately parallel to the longitudinal edges of the screen printing frame, the screen fabric must be set on the frame in such a manner as to be oblique in relation to it. In the setting or tensioning of the screen fabric there may be difficulties since the usual mechanical methods of tensioning the screen fabric lead to a distortion of it and uneven tensioning. These difficulties can be removed by placing an inflatable tube around the frame for tensioning the screen fabric which is placed around the tube and fixed on the opposite side of the frame. Inflation of the tube takes place after the fixing of the fabric. Owing to the expansion of the tube absolutely even tension in all directions is exerted so that there is no distortion of the screen fabric.

In the development of the present invention it has been found that the silver strips on the glass plate after the screen printing may become excessively narrow in places or completely interrupted owing to blockage of the holes of the screen, to excessive drying out of the silver paste, or to insufficient supply of paste. These faults in the strips are often not easy to recognize with the naked eye but may lead to an excessively high resistance or complete electrical interruption of individual resistance strips.

Such a defect cannot be corrected by the following plating. In order to reject such faulty glass plated each resistance strip is tested before the plating as regards its conductivity. For this purpose, after the fusing operation, the glass plate is connected with an electrical circuit and the magnetic field formed about each individual resistance strip owing to the current flow is measured by sensing the individual conductors with an inductive measuring head. The size of the voltage induced in the measuring head, which is suitably amplified and fed to an indicator, is thus indirectly proportional to the resistance of the strip in question. In this manner glass plates with one or more resistance strips having a resistance value outside the tolerances set can be rejected before the electroplating operation.

In the reinforcement of the fused-in silver strips by electroplating the evenness of the copper deposit on all resistance strips the position at which contact is made with the silver coating is of decisive importance. Unlike conventional electroplating procedures the object to be plated has a higher electrical resistance than the electroplating bath. As a result there are special problems primarily due to the fact that inside the resistance strip system to be plated a substantial potential difference appears which leads to uneven field line density and this in turn leads to uneven deposit of metal.

It has been found that this difficulty can be largely removed by making the contact for electroplating on both terminal strip means at a position between the outermost resistance strips, should all individual resistance strips have approximately the same length, the position of making contact is preferably approximately in the middle of the terminal strip means. If on the other hand the resistance strips have different lengths, as is the case for instance with a trapezoidal form of the heated area, the contact position should be moved towards the longest resistance strip so that there is a preferential copper plating of the longer resistance strips.

The method in accordance with the invention is also ideally suited to give the resistance strips in certain selected areas a different resistance value as those in other areas. Thus the heating effect in the selected areas can be made greater. In order to achieve this object the method can be modified by covering the visible area, after the fusing-in of the silver paste, by a material which is not permeable to copper ions, and in a first treatment stage the part of the resistance strips lying outside the viewing area and possibly the terminal strip means are reinforced with a copper layer up to $7\mu$ thick, the cover then being removed and the whole conducting strip system having 0.2 to $5\mu$ thick copper layer applied to it in a second treatment stage which is followed, finally, by a third treatment stage in which the whole conducting strip system is coated with 1 to $6\mu$ thick nickel layer, for instance by electroplating.

For covering the heating field or area a particularly suitable method has been found to be that of laying a plate, of rubber or other similar material, and of the size of the desired heating field, closely on the glass plate and by producing a vacuum at the cavity formed by the glass plate and the sheet or plate of rubber the latter is attached to the glass. Naturally the heating field can also be covered by other means, such as layers of lacquer and adhesive strips.

Another means for achieving a controlled differential plating is that of using a controlled electrical field formation in the electroplating to reinforce the strips so as to achieve a different degree of metal deposition. The required field distribution can be achieved by using several anodes, by varying the distance between the anodes and the glass plate, by screening the anodes in certain directions and by similar methods. This type of controlled reinforcement by electroplating has the advantage that it dispensed with one electroplating stage and with the covering heating area. On the other hand this method leads normally to a less sharp delimitation of the heating field than can be obtained by covering the field.

The method in accordance with the invention is especially suitable for the production of thermally prestressed safety glass plates as are prescribed for use in vehicle construction. In this case the heating of the glass plate to 650 to 680° C. made before bending of the glass plates into the required form and the actual prestressing process, that is to say the accelerated cooling from this temperature to a temperature below the strain point, is simultaneously used in order to fuse-in the conducting strip system applied. Thus there is no modification necessary in the production of solid safety glass plates since the method steps of applying the silver paste to the unbent glass plate and the drying of the silver paste are performed before the heating while after the conventional heating and prestressing the electroplating and the application of the current connecting elements or terminals can be carried out.

A further substantial advantage lies in that the necessary current connecting elements can be soldered on to the connecting strip means with the aid of induction soldering. Contact clips which produce an electrical contact only by a mechanical pressing action onto the terminal strip means have been found unsatisfactory because in many cases, owing to the shaking or rattling of fitted motor vehicle windows and the collection of moisture at these positions, they lead to faults because the contact resistance is excessive, this being due in part to corrosion of the metal due to the collection of moisture. In order to insure the production of heated glass plates which satisfactorily function for long periods of time it is necessary to solder the current connecting elements to the terminal strip means.

For welding-on the current connecting elements it has been found that the usual soldering methods for producing soldered connections on glass plates are unsuitable. In the case of the use of a soldering iron, for example, the heat required for soldering is too sudden and to localized so that damage such as splitting or chipping of the glass plate may easily occur.

It has been found in the development of the present invention that these difficulties can be completely removed if the soldering-on of the current connecting elements or terminals is carried out by means of induction soldering. This method has the substantial advantage that, on the one hand, the amount of heat is precisely set and is produced to a large degree in the metallic current connecting element so that a violent heating action is avoided, and on the other hand strong temperature gradients are avoided in the glass plate since inside the terminal strip means there is necessarily a gradual temperature gradient because the greater the distance from the point of soldering the less the magnetic flux. The use of induction soldering thus brings substantial advantages and it is obligatory for economic mass production.

Another object of the invention is to provide various forms of apparatus for carrying out the method in accordance with the invention. These forms of apparatus are now described with reference to the drawings.

In the following description referring to the drawings the essential advantages of a heated plate in accordance with a preferred method of production and devices for carrying out will be described. As a preferred method of production mechanical reinforcement deposited by electroplating will be described though naturally other methods of applying metal could be used, for instance the methods described in the U.S. patent specification 2,532,-283 or 2,658,841 for the deposition of a nickel layer.

FIG. 4 is an electrically heated motor vehicle rear window with a central viewing area;

FIG. 5 shows a current connecting element or terminal in the most simple form of construction in accordance with the invention;

FIG. 6 is a diagram serving to explain the connection by soldering of connecting elements;

FIGS. 7 to 9 show various forms of a connecting element in accordance with the invention;

FIG. 10 shows the construction of glass windows used in road vehicles;

FIG. 11 is a block diagram indicating the nature of the method in accordance with the invention;

FIG. 15 is a machine suitable for automatic screen printing;

FIG. 16 shows a covering panel or plate applied by vacuum to a glass plate in order to produce a viewing area;

FIG. 17 shows an installation for the reinforcement by electroplating of resistance strips, and FIG. 18 shows an induction soldering machine for soldering-on connecting elements.

Figure 1:
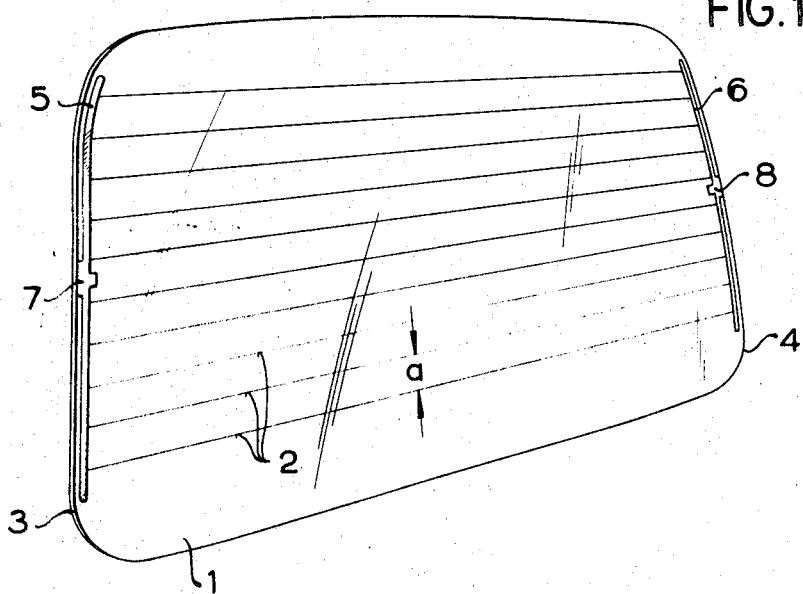
FIGS. 1 and 2 are a general view of two electrically heated motor vehicle rear window plates in perspective.

The invention will now be described in detail with reference to electrically heated motor vehicle rear windows which are clearly only to be regarded as examples. The rear motor vehicle windows shown in FIGS. 1 and 2 are the same in construction and only differ as regards their shape and by the arrangement of the resistance strips.

The glass plate 1 is plane and formed of prestressed safety glass. Resistance strips 2 are arranged horizontally on the interior surface. Their mutual spacing $a$ is about 30 mm. Along the vertical edges 3 and 4 of the plate there are terminal strip means 5 and 6, of about 1 cm. broad, arranged at a small distance from the edge of the plate. In the middle the terminal strip means 5 and 6 are broadened out over a certain area as far as the edge of the plate so that somewhat broader areas 7 and 8 result on which the connecting or terminal elements are soldered. The resistance strips 2 merge at their ends into the terminal strip means 5 and 6. The breadth of the resistant strips amounts to between 0.4 to 0.6 mm.

Figure 2:
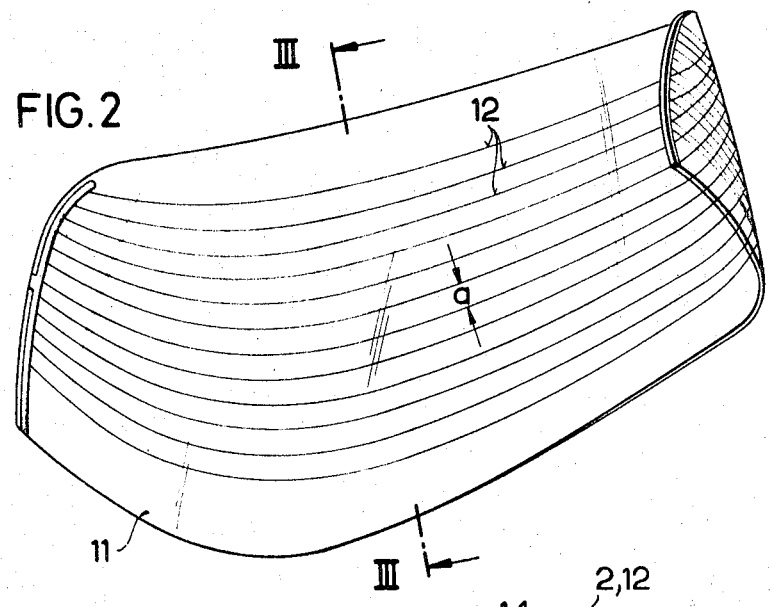

FIG. 2 shows a strongly curved motor vehicle rear window 11 which has its concave surface provided with resistance strips 12 which are arranged in such a manner on the glass plate 11 that when the latter is mounted they extend horizontally as far as this can be arranged. This construction insures that the mutual spacing $a$ of the resistance strips, which in the central region again amounts to about 30 mm., steadily decreases towards the vertical edges, along which, again, connecting or terminal strips means are arranged.

Figure 3:
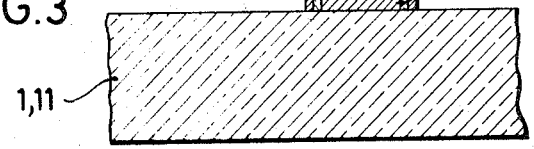
FIG. 3 is a partial section along the line III—III of FIG. 2.
Figure 12:
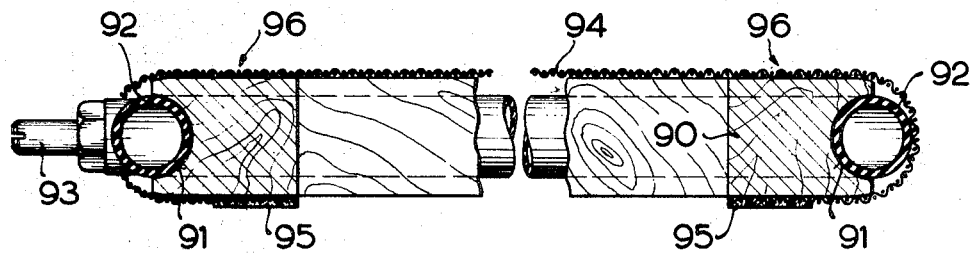
FIG. 12 is a cross-section through a screen frame during setting or tensioning.
Figure 13:
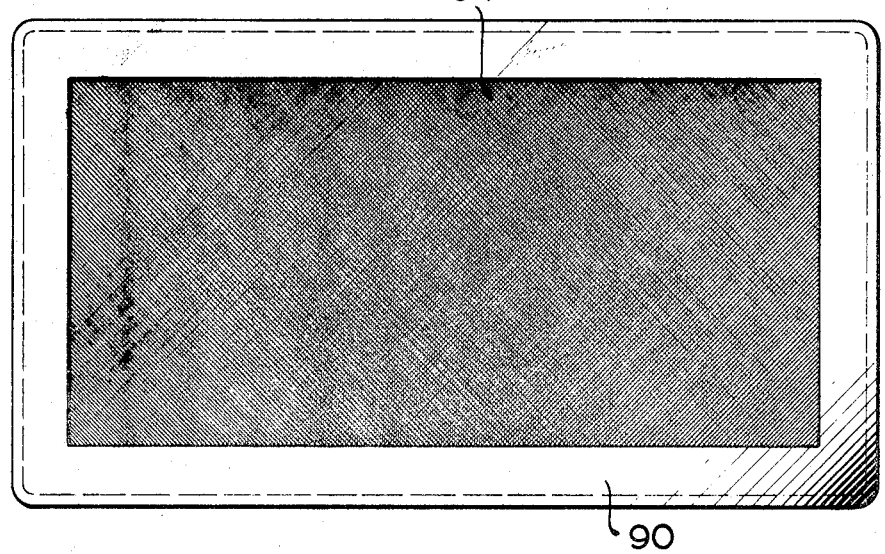
FIG. 13 is a view of a screen stencil with an obliquely arranged screen printing screen.

FIG. 3 shows the principle of construction of the resistance strips 2 and 12 which comprise a first layer 13 which is applied by screen printing, is 0.2 to 0.8 mm. broad and 1 to 20μ thick, and contains metallic silver particles which are fused-in at raised temperatures. On top of this layer 13 there is an electrically deposited copper layer 14 of 0.2 to 12μ thick, and on this latter layer there is an electrically or otherwise deposited nickel layer 15 of 1 to 6μ thick.

FIG. 4 shows an electrically heated motor vehicle window 21 whose resistance strips 22 also extend along the whole breadth of the plate from the vertical plate edge 23 to the oppositely placed edge 24 so as to join the terminal strip means 25 and 26 running along these edges. The end sections 22a of the resistance strips 22 are, however, provided with a thicker copper layer of the order of 5 to 12μ thick while in their central part 22b, that is to say in the part through which the road behind the vehicle is observed through the mirror, are only provided with a copper layer of less than 5μ in thickness. Owing to the thicker copper deposits at the end sections 22a of the resistance strips the breadth of the resistance strips is hardly changed so that the difference between the resistance strips inside and outside the field of view is hardly noticed. The different deposit, however, is sufficient to concentrate the heating effect of the resistance strips substantially to the middle field of view.

FIGS. 5 to 9 show various forms of current connecting elements or terminals soldered to the terminal strip means. In principle, the terminal elements consist of a flat metal body 30 to be soldered to the terminal strip means and having on it a connecting tag 31 with which a current supply lead or cable 32 (see FIG. 8) is either soldered or joined by means of a corresponding flat pin connector 33 (see FIG. 8). In the first embodiment shown in FIG. 5 the flat metal body 30 has the form of a large E. The length of the outer bar parts 34 and 35 is somewhat less than the breadth of the connecting strip means 36. Preferably the connecting element is so soldered that between the edges of the bars 34 and 35 and the edges of the terminal strip means 36 there remains a minimum clearance of 0.5 to 1 mm. which is filled with the solder metal.

In this manner mechanical stresses transmitted to the terminal strip means are transferred with a low stress concentration to a larger surface so that as a result the strength of the connection is increased. The middle bar 37 is made longer and the lengthened part is bent approximately at right angles to provide a connection tag 31. Only the transverse bars 34 and 35 are soldered to the collecting strip means 36 as is indicated by reference numerals 34a and 35a in FIG. 6. The part 38 of the metal body lying between the bars 34 and 35 has no direct connection with the terminal strip means and is so dimensioned that thermal stresses in the part 38 due to differences in thermal expansion of the metal body and the glass plate (the coefficient of thermal expansion of glass is about 10 times less than that of metal) are taken up by elastic or plastic deformation of the part 38.

In order to prevent the formation of soldered joint between the middle part 38 with the terminal strip means 36 a suitable coating suitable for preventing the formation of such a joint can be applied, for example on the part 38 or on the corresponding part of the terminal strip means. A further possibility is to recess out a corresponding zone underneath this part 38 in the terminal strip means 36 so that this zone does not receive a metal coating.

Also the middle bar 37 is not connected with the terminal strip means 36 and is so dimensioned that on the application of a mechanical force on the connecting tag 31, as for instance occurs when a connection plug is inserted or removed, or when the tag catches against something during transport, the bar 37 is elastically or plastically deformed. In this manner abrupt and excessive mechanical stresses on the soldered connections are avoided.

The current connecting element shown in FIG. 7 is constructed in principle like the one just described. However, it has the improvement that the elongated bar part 47 between the two outer bars 44 and 45 is bent at 48 and 49 so that it does not rest on the terminal strip means 36 but is spaced from it. The distance from the terminal strip means can be in the order of 1 mm. Owing to this bending the connecting element is able to give, resiliently or non-resiliently, in the direction of the longitudinal bar 47, this being important for taking-up thermally induced stresses. This bending provides a simple and reliable method of preventing soldering of the longitudinal bar 47 with the terminal strip means 36.

FIG. 8 shows a modified embodiment in which two connecting tags 51 and 52 are provided and run parallel to the edge 60 of the glass plate as does the longitudinal bar 57 which is bent at 58 and 59. The connecting element is connected by means of connecting pieces 61 and 62 bent at right angles with terminal strip means. This arrangement has the advantage that the rubber mounting material lying on top of the current connecting element can lie in a more satisfactory manner against the glass plate so that there is a satisfactory seal. Also the connecting cable or flex 32 can be placed within the rubber mounting so that it is invisible. Also the glass plate can have a slight recess at the position of the connecting element so that the latter does not project beyond the adjacent marginal part of the glass. Owing to the arrangement of two connecting tags 51 and 52 pointing in opposite directions the connecting cable can be led in from one or the other side as may be desired and one and the same connecting element can be used for both sides of the glass plate.

FIG. 9 shows a connecting element similarly constructed to that just described but is modified to have better mechanical properties since the junction between the double connecting tag 63, 64 and the longitudinal bar 67 is placed on the side opposite the cross bars 68 and 69 which are bent and are soldered to the terminal strip means. Also the length of the connecting line $S_a$ between the bent cross bars 68 and 69 and the longitudinal bar 67 is considerably reduced. As a result there are three lines $S_a$ and $S_b$ along which bending or breaking-off will occur if a mechanical stress is applied so that the soldered joints are spared. If the action of the force occurs in the direction of the arrow $K_a$ on the edge remote from the soldered connection, the longitudinal bar 67 is bent about the preferential line of bending $S_a$ shown in broken lines; if on the other hand it occurs on the other side in the direction of the arrow $K_b$ the double connection tag 63, 64 is bent about the broken lines $S_b$. Since the connecting element is arranged on the edge of the glass it has a breadth equal to about half of the thickness of the glass plate, a line of force action in the direction of the two arrows $K_a$ and $K_b$ represents the stress or thrust most likely to occur. A current connecting element with these additional properties thus has an increased degree of security as regards all thrusts of a mechanical and thermal nature.

FIG. 10 is a partial view of a glass plate 73 carried in a rubber mounting 72 which fits over the terminal strip means 74. The latter is therefore so broad that only a part of it is covered by the rubber strip forming the mounting 72. A part of the breadth A is free and does not come into engagement with the rubber strip of the mountain 72. This part A of the breadth is preferably so dimensioned that it is sufficient for supplying current to all the resistance strips 75. The terminal element 76 is so dimensioned that at least the cross bars 77 and 78, which are soldered to the terminal strip means 74, are soldered at least to a small extent with the part A of the terminal strip means 74 so that the contact with the part A is always guaranteed even if the whole of the region of the terminal strip means 74 covered by the rubber ceases to serve as a conductor.

The following part of the specification referring to FIGS. 11 to 18 describes some preferred embodiments of the method in accordance with the invention, more particularly for producing motor vehicle rear windows. The most important steps are shown in FIG. 11 in the form of a block diagram and will be explained below in the sequence in which they are shown in this diagram:

(I) PRODUCTION OF SCREEN PRINTING STENCIL

Before the screen printing process can be carried out the stencil must be prepared. Since it is prepared photomechanically, the first step is to produce a negative of the natural size and corresponding exactly to the pattern or master to be printed, that is to say in a form corresponding to the master or pattern when developed onto a plane surface.

For this purpose the position of the uppermost and lowermost resistance strips and of the terminal strip means are marked on a glass plate, which has already been bent, by means of a suitable marker, care being taken to see that the resistance strips have positions which correspond to the horizontal position when the glass plate is mounted in the vehicle. After marking these lines light sensitive paper is placed closely against the convex surface of the glass plate and then exposed so as to form an image on the light sensitive paper of the arrangement of the lines.

This paper which has an image of the uppermost and lowermost resistance strips and the terminal strip means developed onto a plane surface then gets the remaining resistance strips drawn on it, care being taken to see that the mutual spacing of the individual heating conductors at the axis of symmetry of the glass plate is about 30 mm. and that the spacing decreases in a horizontal direction as the distance from the axis of symmetry increases, in the case of a window in which the uppermost and lowermost resistance strips run together towards the collecting strip means. For this purpose construction lines are marked in at regular distances perpendicular to the lowermost resistance strip, each such construction line being divided into $n-1$ equal parts, $n$ denoting the number of resistance strips desired.

After the developed representation of the pattern to be printed has been produced in this manner a diapositive is produced from the drawing, the pattern being transferred to transparent paper placed over the drawing. The terminal strip means are then drawn-in with black ink in the requred shape. For drawing the narrow resistance strips it is difficult to use black ink and keep the same width of line. The most convenient method for insuring that the line width is even is to prepare a curved ruler for each resistance strip. The ruler is then used to guide a rolling device described in the U.S. patent specification 2,918,189 which lays a self-adhesive opaque foil strip with a breadth of about 0.4 mm. onto the transparent paper. When all the resistance strips have been arranged on the transparent paper in this manner the diapositive is finished.

Figure 14:
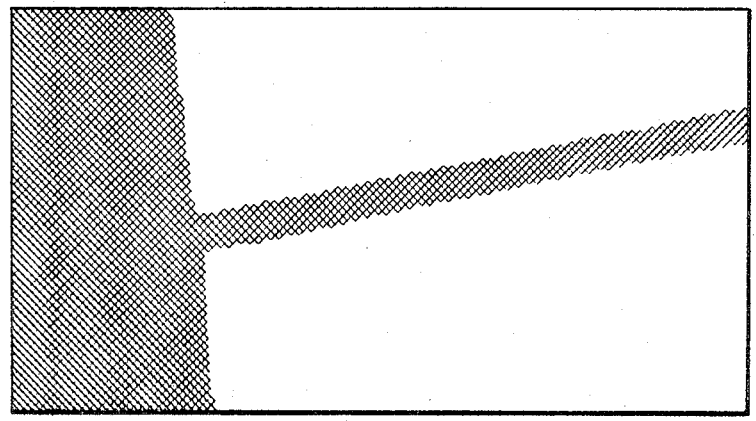
FIG. 14 is a section of the screen printing stencil on a larger scale.

The next step is that of transferring the diapositive onto the screen printing fabric. For this purpose a suitably large piece of screen printing fabric, for example of the type commercially sold under the name of "Estalmono 120 HD" with 120 threads per centimeter is mounted on a frame 90 (see FIGS. 12 and 13). In order to insure that the resistance strips have edges with fine teeth or steps, as is shown in FIG. 14 with an enlargement factor of 10, the screen printing fabric is so set on the frame 90 that the images of the resistance strips later to be arranged on the fabric cross the threads of the fabric at an angle between 14 to 76°.

For mounting or stretching the fabric on the frame the procedure is as follows: The frame 90 which can be made of wood or metal and which preferably has a peripheral groove 91 running round it has a rubber hose 92 with a valve 93 laid about it. The screen printing fabric 94 is then set on side of the frame 90 with the prescribed degree of obliqueness of the threads. The ends of the fabrics of all sides of the frame are then placed loosely around the rubber tube and the fabric is attached by means of an adhesive to the lower side 95 of the frame 90. After the adhesive has set the rubber tube 92 is pumped up through valve 93 until the fabric has been strained to the desired degree. The fabric is then fixed on the upper side of the frame at 96 with a suitable adhesive and after the latter has set the fabric projecting over the frame 90 is cut-off and the hose 92 removed.

Using suitable illumination the light-sensitive coating material, for example the material commercially sold under the name "Alkoset," is then applied to the screen printing fabric and dried. The previously prepared diapositive is then laid closely against the screen printing fabric and the photosensitive layer is exposed using a suitably strong source of illumination.

After exposure the unexposed parts of the coating material are washed out of the fabric and after drying the latter, which represents the finished stencil, is ready for use.

(II) APPLICATION OF THE SILVER PASTE ONTO THE GLASS PLATE

The application of the silver paste is carried out automatically with the screen printing machine shown in FIG. 15. The machine consists of a stand 110 in whose cross piece 111 transport shafts 112 are journalled. These shafts carry pulleys or wheels 113 over which transport belts or straps 114 run. The shaft 112 is driven by a sprocket drive 115 by an electric motor 116.

Along the so-formed horizontal transport path there are three working stations A, B and C. In station A the glass plate to be printed is laid on the transport path, in station B the actual screen printing means are arranged and in station C a heating chamber is arranged through which the transport path passes for subjecting the silver paste image to dry.

The actual screen printing device comprises a travelling frame 122 which is arranged to run along a path 121 on rollers 120, the path being across the direction of travel of the glass plates. Crosspieces 123 and screws serve to hold the screen printing frame 124 with the finished screen printing stencil 125 onto the frame 123. On the frame 122 and in a longitudinal direction of the latter there is a guide path 126 for the rake or doctor 127 which moves over the stencil 125 and presses the screen printing paste through it. At the end of this guide path 126 there is a drive 128, shown diagrammatically, for moving the doctor along the guide path 126.

The frame 122 is moved either manually or by means of a motor drive, not shown, along the path 121 into a position above the table 130. In this position the stencil 124, 125 is readily accessible. This arrangement has the substantial advantage that the screen printing stencil is accessible during operation without it being necessary to disassemble the installation to a significant extent. Rapid access to the stencil is necessary from time to time in order to clean it in case it should have become clogged so that individual strips become interrupted owing to blockage of individual holes in the fabric.

At the station B the transport path for the glass plate a plate 135 underneath the transport bands or belts 114 is arranged and can be moved up and down. On this plate 135 there are a number of upwardly projecting support fingers 136. On raising the plate 135 by means of a hydraulic cylinder, not shown, the support fingers 136 engage the glass plate 137 lying on the transport bands 114 and raise it into the working position, that is to say so far that the upwardly moving glass plate 137 comes into contact with the bottom of the screen stencil 125.

At station B there are adjustment abutments 140 which precisely determine the position of the glass plate before the actual printing process. The abutments 140 are arranged on a shaft 141 which can be moved along its axis by the action of a pressure-operated cylinder 142.

The working station C is a electrically heated passage 145 above the transport path for the glass plates. The latter after printing enter through the opening 146 into the heating passage in which the silver paste image is dried so that the glass plates can then be further worked.

The machine operates as follows: After a plane glass plate 137 has been laid in station A on the transport bands 114 the motor 116 is switched on so that the glass plate is transported to station B. The motor 116 is switched off by a terminal switch, not shown, as soon as the glass plate 137 is underneath the stencil 125. The table 135 with the support fingers 136 then rises and lifts the glass plate 137 until it is only a small distance from the printing stencil 125. The cylinder 142 and, possibly, a further pressure cylinder, not shown, arranged on the other side, is then put under pressure so that the glass plate 137 is moved into its final position which is determined by means of the setting or adjusting abutments 140. After the glass plate 137 has been moved into its final position in this manner, the doctor 127 is moved by means of the drive 128 so that it moves once over the screen printing stencil 125 in the longitudinal direction so that the screen printing paste is pressed through the open holes of the stencil onto the glass plate 137.

As a silver paste it is possible to use a suspension of metallic silver and a lead borosilicate in an organic base which evaporates on heating. The following composition, in percentages by weight of the non-volatile components, has been found satisfactory: 90–92% Ag, 6.7–7% PbO, 0.2–0.3% $SiO_2$, 1–1.5% $B_2O_3$.

The next step is the lowering of the table 135 so that the glass pate 137 is again rested on the transport belts 114. The motor 116 is switched on again, transports the printed glass plate 137 into the heating passage 145 and simultaneously moves a new glass plate, which in the meantime has been placed on the transport path in station A, to station B where the printing operation is repeated in the manner just described.

(III) DRYING OF THE SILVER PASTE ON THE GLASS SHEET

The drying of the silver paste is carried out in the heating passage 145 described above. The passage 145 has a suitable number of infrared heaters or hot air producers which heat the glass plates to about 80° C. At this temperature the volatile components of the silver paste evaporate.

(IV) INCORPORATION OF SILVER PASTE IN SURFACE OF SHEET

The silver paste is incorporated or fused into the glass surface at temperatures between 600 and 680° C. so that there is a physical connection and a chemical bonding with the glass surface. Any volatile components of the silver paste left over from the drying process are then completely removed. Since at the temperatures employed the glass softens, the glass plates must be so supported that any deformation, which would lead to optical distortions, is avoided. For this purpose it has been found best to suspend the glass plates by means of tongs which engage their upper edges and close under the action of gravity.

(V) BENDING AND/OR COOLING OF THE GLASS PLATES

The glass plates with the fused-in silver strips can be subjected to various forms of further treatment in accordance with the properties desired of the finished electrically heated glass plate.

(V–A) PRODUCTION OF BENT PRESTRESSED GLASS SHEETS

Immediately after the fusing-in or incorporation operation at about 650° C., which is so timed that the whole glass plate assumes this temperature, the glass plate is bent into the required form. For this purpose it is, suspended by the tongs, brought between two pressing tools which close together to shape the glass plate. After the pressing step the pressing tools again open and the bent glass plate carried by the tongs is brought into suitable blowing boxes adapted to suit the shape of the plates so that the air jets in the blowing boxes bring about accelerated cooling.

(V–A) PRODUCTION OF A BENT NON-PRE-STRESSED GLASS PLATE

For the production of bent electrically heated glass plates without pre-stressing the so-called skeleton bending method is used. In this case the glass plates provided with the silver strips are held over a so-called skeleton bending mould or shape, that is to say a bending mould with a frame having a shape corresponding to that to be produced in the glass plate. The latter, which in the plane condition only rests on a few points then sinks down with increased heating into the peripheral bending mould and is passed after the bending together with the peripheral mould through a cooling passage in which the glass plate is slowly cooled to room temperature at a preestablished rate. Such glass plates can be made into sandwich-type safety glass consisting of two glass plates connected by means of intermediate plastic layer, usually polyvinyl butyral. Only one of the two individual glass plates of such a construction need be provided with resistance strips and the latter can be placed on the outer surface of the safety glass, on one glass surface bonded to the plastic layer or on both glass plates.

(V–B) PRODUCTION OF A PLANE PRE-STRESSED GLASS PLATE

For the production of a plane pre-stressed glass plate, after fusing-in the silver strips at about 650° the glass plate, preferably hanging vertically from tongs, is introduced into blowing boxes provided with blowing nozzles and cooled at an accelerated rate by the blown air.

(V–C) PRODUCTION OF A PLANE NON-PRE-STRESSED GLASS PLATE

The fusing-in of the silver strips occurs as with the above described methods but the glass plate is slowly cooled at a controlled rate.

(VI) INSPECTION OF RESISTANCE STRIPS

A first visual inspection of the silver strips is carried out after application of the silver paste as the glass plates emerge with the silver image from the heating passage. In this manner substantial faults in the silver strip image are found and the defective plates rejected. In order to detect the smallest faults, which might give rise to small variations in resistance, the resistance of the individual strips is measured after cooling of the glass plates after the fusing-in or incorporation operation. For this purpose each individual glass plate is connected with an AC current supply and the magnetic field formed about each resistance strip in accordance with the current flowing through it so as to determine a direct measurement for the resistance of each individual strip. For this purpose an induction measuring head is placed over each individual resistance strip and the voltage induced in the head is suitably amplified and measured. Should the measured voltage not be within upper and lower limits, that is to say when the resistance of a resistance strip is not within a certain tolerance range, the measuring instrument is arranged to provide a signal and the glass plate is rejected.

Before the glass plates are subjected to the electroplating treatment the total resistance of each individual glass plate is measured and glass plates with the same resistances arranged in groups so that in the following electroplating a large number of glass plates corresponding to the same initial requirements for electroplating are present.

(VII) REINFORCEMENT OF THE STRIPS BY ELECTROPLATING

The glass plates are cleaned, for example in an acid bath or mechanically. They are then suspended from a carrier frame 150 (see FIG. 16) which comprises a cross beam 151 which can be moved in a horizontal and a vertical direction. The carrier frame 150 also comprises arms 152 which extend downwards and are provided with holding devices 153 for the glass plate. The glass plate is located by means of a fork-shaped holding means 154 which extends above the upper edge of the glass plate, the holding means 154 being carried by means of a bracket 155 attached to the cross beam. Contact clips 156 and 157 are then placed approximately in the middle of each of the terminal strip means and are connected with the negative pole of the current supply. Should the resistance strips not all have the same length, that is to say their length vary in accordance with the nonparallel sides of a trapezoidal glass plate, the contact clips must be fitted on the terminal strip means at a position in which the partial current flows to each side of each clip are the same. The glass plate mounted in this manner is then provided in a copperplating bath with a bright ductile copper deposit.

An electroplating bath composition sold commercially under the name "Glanzkupferbad Cuprorapid Brilliant" has been found suitable for carrying out the invention.

The anodes in the copper bath used can be copper anodes used for producing a bright copper deposit. The current density during electroplating for the above mentioned bath composition should be less than 20 amps per square decimeter on the surface to be plated. The size of the anodes should be such that the current density on the anode surface is not higher than 4 amps per square decimeter.

(VII–A) EVEN COPPERPLATING TO ACHIEVE THE DESIRED RESISTANCE

If the heating conductors are to serve for heating along the whole of their length the electroplating is so carried out that an even copper deposit is produced along them. For this purpose a copper anode about 40 cm. long and 10 cm. broad is arranged opposite the printed side of the glass plate so as to be symmetrical in relation to the terminal strip means. The conditions of electroplating are set in accordance with the initial resistance of the glass plate.

The decrease in resistance brought about by the subsequent nickel plating is taken into account with the copper plating.

By way of example it may be mentioned that in the case of electroplating total heating conductor and terminal strip means surface area of 1 square decimeter, at a voltage of 1.5 volts and a current density of 7 amps per aquare decimeter the time for electroplating required is less than 2 minutes. In this time the total resistance of the conductor system sinks to about 1.4 ohms. The following nickel plating reduces the resistance further by 0.1 ohm so that the final total resistance is about 1.3 ohms. With an operational voltage of 12 volts this value corresponds to a power of 110 watts; with a total heating surface of 26 square decimeter this value corresponds to 4 watts per square decimeter.

After the electroplating the glass plate is thoroughly washed with water and dried.

(VII–B) DIFFERENTIAL COPPERPLATING

Differential copperplating is carried out if a single copperplating operation is to be used to achieve a thinner copper deposit in a part of the plate, for instance in the middle, in order to insure that the greater part of the heating power is developed in this middle part. A suitable arrangement for carrying out this includes the use of two anodes in the copperplating bath which are arranged opposite to, and spaced from, terminal strip means. In this arrangement the field flux density at the end parts of the resistance strips is substantially greater so that a thicker copper deposit is made here than in the central part. The way in which the field density can be varied within wide limits by the shape of the anodes and their spacing from the glass plate and by means of screening devices of dielectric material arranged at a distance from the anodes. By suitable choice of these measures the optimal conditions for achieving a particular purpose may be set.

The remaining conditions for electroplating correspond substantially with those given in the Example VII–A.

(VII–C) COPPERPLATING WITH THE VIEWING AREA COVERED

While with the method just described there is a gradual transition as regards the thickness of the copper deposit between the viewing area and the lateral parts of the resistance strips, a more sudden transition in the copper deposit can be achieved if the copperplating is carried out in two steps, one step in which the resistance in the viewing area is brought to the required value, and another stage in which the viewing area is covered and the remainder of the glass plate is further galvanized.

The following method of precedure has been found suitable: Firstly a rubber plate or panel 160 (FIG. 16) with the size of the viewing area is placed in close contact against the glass plate (see FIG. 11, VII CC). The rubber plate whose edge regions are comparatively resilient, is provided on the side lying against the glass plate with a system of air suction channels 161 and also has a valve 162. After applying the rubber plate to the required part of the glass plate the air between the glass plate and the rubber plate is drawn off through the valve 162 so that the rubber plate is brought into close contact with the glass plate.

The next step is the copperplating of the glass plate with the rubber plate in position under the conditions described in VIA. Next the glass plate is rinsed and after removing the rubber plate after opening the valve 162 it is subjected to further copperplating (see FIG. 11 VII CCC) with the conditions described in section VIIIA. Naturally the glass plate can be in a first step evenly copperplated and thereafter, in a second step, be plated on the previously covered area and thus subjected to further copperplating.

(VIII) NICKELPLATING

After thorough rinsing of the copperplated glass plates the latter are provided with a bright ductile nickel layer of about 1 μ in thickness using a conventional bright nickel plating bath.

As a bath composition for this purpose satisfactory results have been obtained with the nickel bath materials sold commercially under the name "Hochglanznickelbad Epely AB."

The voltage depends upon the electrode spacing and is to be so adjusted that a current density of less than 20 amps per square decimeter is obtained on the surface to be plated. Under these conditions the nickel plate required is obtained in 1 to 2 minutes.

FIG. 17 shows an electroplating installation made up of three containers 170, 171, and 172 arranged one behind the other, such an arrangement having been found suitable for the nickelplating process. In the container 170 there is the nickelplating bath, in the container 171 a rinsing bath in which the glass plates are dipped after nickelplating, and above and below the container 172 there are a series of spray nozzles 173 with which the last residue of chemicals from the nickelplating bath are rinsed off.

(IX) SOLDERING OF CONNECTIONS

FIG. 18 shows an induction soldering device with which the current connection elements or terminals are soldered onto the terminal strip means. It consists basically of a frame construction 180 on which there are arranged a working table 181, and above this a pressing tool 183 operated by a compressed air cylinder 182. On the working table 181 there is placed an abutment rail 184 against which the glass plate 185 comes to rest. In the middle the working table 181 has a recess within which there is an inductor 186 consisting of a circular tube through which cooling water passes and which is connected with a medium frequency current cource. Concentric to the inductor 186 there is at a higher level a compressed air cylinder 182. At the end of the piston rod 187 there is a sliding guide piece 188 sliding in a correspondingly shaped rail 189, the guide piece carrying a pressing tool 183. The pressing tool 183 is so constructed that on being lowered it comes to rest on the two pieces 191, 192 to be soldered to the terminal strip means and fixes the current connecting elements in this manner during soldering onto the terminal strip means. The pressing tool 183 itself consists of dielectric material so that it is not heated by the induction current.

The switching-on and -off of the inductor 186 and the operation of the cylinder 182 occur in such a timed sequence that first the pressing tool 183 sinks onto the current connecting element, then the inductor 186 is switched on for a predetermined interval as required for the melting of the solder, after the switching-off of the inductor, the pressing tool remains resting on the current connecting element until the solder has hardened, and then the cylinder 182 is depressurized so that the pressing tool is returned to its initial position by means of a helical spring arranged inside the cylinder 182.

In order to solder the current connecting element onto the terminal strip means, pieces of solder in foil form having a size corresponding to the pieces 191, 192 to be soldered on are placed on the areas of the current connecting element which are to be soldered and the element is then placed on the terminal strip means 190 in the desired position. The glass plate is then placed on the working table 181 so that it abuts against the abutment 184, the current connecting element coming underneath the pressing tool 183. Then a switch is operated which initiates operation of the programming device described so that the soldering operation is carried out automatically.

While some concrete forms of the invention have been described it is to be understood that the invention may undergo many modifications within the gist and spirit of the following patent claims.

We claim:
1. A method of making an electrically heated glass window plate comprising the steps of applying a number of narrow line-like strips of a paste containing metallic silver across surface portions of the glass, fusing the silver paste into the surface of the glass by application of heat to form wire-like resistive heating strips therefrom, and successively depositing at least one layer of each of two different metals upon said fused-in resistive strips to form a three-layered strip construction.

2. A method according to claim 1, wherein said strips of paste are applied to said glass by a printing process.

3. A method according to claim 2, wherein said printing process comprises screen printing.

4. A method according to claim 1, wherein the step of depositing said layers upon said fused-in resistive strips comprises electroplating a metal upon the same.

5. A method according to claim 4, wherein the total resistance of the fused-in resistive strips is measured prior to said plating, and said plating is carried out in accordance with the resistance measured to achieve an electrical power absorption of a predetermined value per unit area of surface.

6. A method according to claim 4, wherein said plating step comprises first electrodepositing a layer of copper.

7. A method according to claim 6, wherein said electroplating step further comprises electrodepositing a layer of nickel atop said layer of copper.

8. A method according to claim 4, further including the step of attaching terminal means in electrical contact with the plated resistive heating strips by induction soldering.

9. A method according to claim 6 for producing an electrically heated glass plate with resistance strips passing from one edge of the plate to the other and a zone, which covers part of the area of the plate, in which a greater heating effect is brought about, in which after the fusing-in of the silver paste the particular zone of the glass which is to be more strongly heated is covered by a material which is impervious to copper ions and in a first treatment stage the part of the resistance strips lying outside the zone are covered with a copper layer up to $7\mu$ thick, the zone is exposed and in a further treatment stage 0.2 to $5\mu$ of copper are plated onto the strips, the copper finally being covered in a third treatment stage with 1 to $6\mu$ of nickel.

10. A method according to claim 9 in which for covering the particular zone of the plate use is made of a plate of rubber-like material so as to make a sealing engagement with it and air is exhausted from a space between the rubber-like material and the glass plate.

11. A method according to claim 9 in which in order to cause a greater deposit of copper over part of the strips lying outside a zone which is to be more strongly heated than the rest of the glass plate, electroplating means are used which cause a variation in field line density.

12. A method according to claim 11 in which after fusing-in the resistance strips besides measuring the total resistance necessary for determining the degree of plating, the resistance of each individual resistance strip is checked by means of an inductive measuring head which is placed near the strips one after the other when a current is flowing through them.

13. A method of making an electrically heated glass window plate comprising the steps of applying a number of narrow line-like strips of a paste containing metallic silver across surface portions of the glass, fusing the silver paste into the surface of the glass by application of heat to form wire-like resistive heating strips therefrom, measuring the total resistance of at least some of said fused-in resistance strips, and depositing at least one layer of metal atop said strips after said measuring and in accordance with the measured resistance to achieve a predetermined desired ultimate such resistance.

14. A method according to claim 13 in which the depositing step is electroplating, and in the plating step a number of glass plates with different measured electrical resistances in their strips are simultaneously plated in the same bath, different electrical resistances being connected in series with them individually so as to achieve the same final resistance for all the plates so plated together.

15. A method according to claim 13 in which after measuring the total resistance of the glass plates after the fusing-in of the paste groups of plates with approximately the same total resistance are made up and the plates in such groups are electroplated together in the same bath.

16. A method according to claim 13 in which said strips of paste are applied to said glass plates by screen printing, and such printing is so carried out that the angle between the printed strips and the threads of the screen printing fabric is between 14° and 76°.

17. A method according to claim 13 in which the strips of paste are applied to said glass plates by screen printing, and the screen stencil used in the screen printing is drawn taut over a frame by means of an inflatable hose running around the frame.

References Cited

UNITED STATES PATENTS

| | | | |
|---|---|---|---|
| 2,878,357 | 3/1959 | Thomson et al. | 219—203X |
| 3,288,983 | 11/1966 | Lear | 219—203X |
| 3,366,777 | 1/1968 | Brittan et al. | 219—203X |

OTHER REFERENCES

National Bureau of Standards Misc. Publication 192; New Advances in Printed Circuits, 1947, pp. 15–20.

JOHN F. CAMPBELL, Primary Examiner

V. A. DI PALMA, Assistant Examiner

U.S. Cl. X.R.

29—620; 219—203